Feb. 8, 1927.
P. W. KEAN
1,617,256
ROAD GRADER
Filed Feb. 25, 1926   3 Sheets-Sheet 1
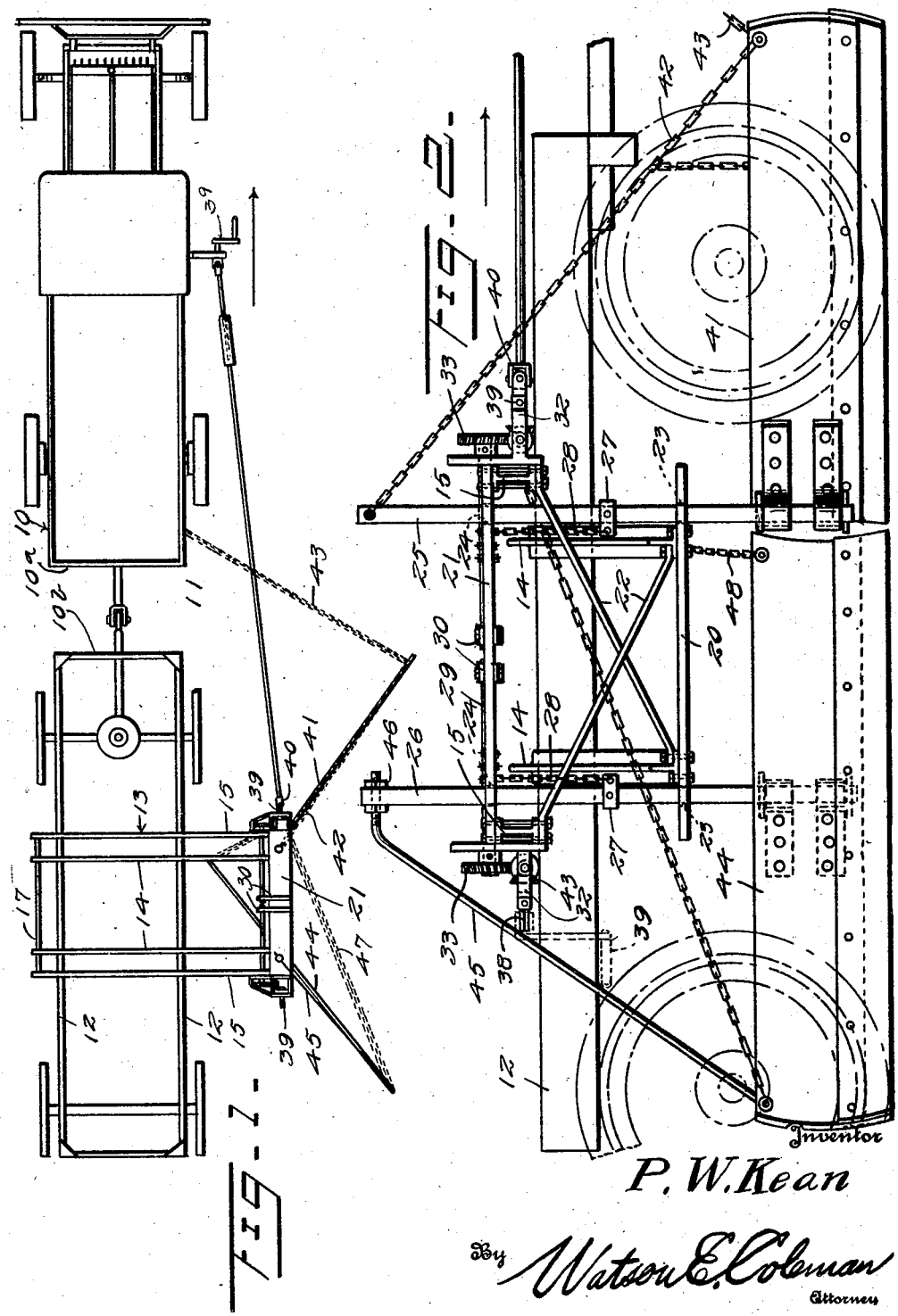

Feb. 8, 1927. 1,617,256
P. W. KEAN
ROAD GRADER
Filed Feb. 25, 1926    3 Sheets-Sheet 2
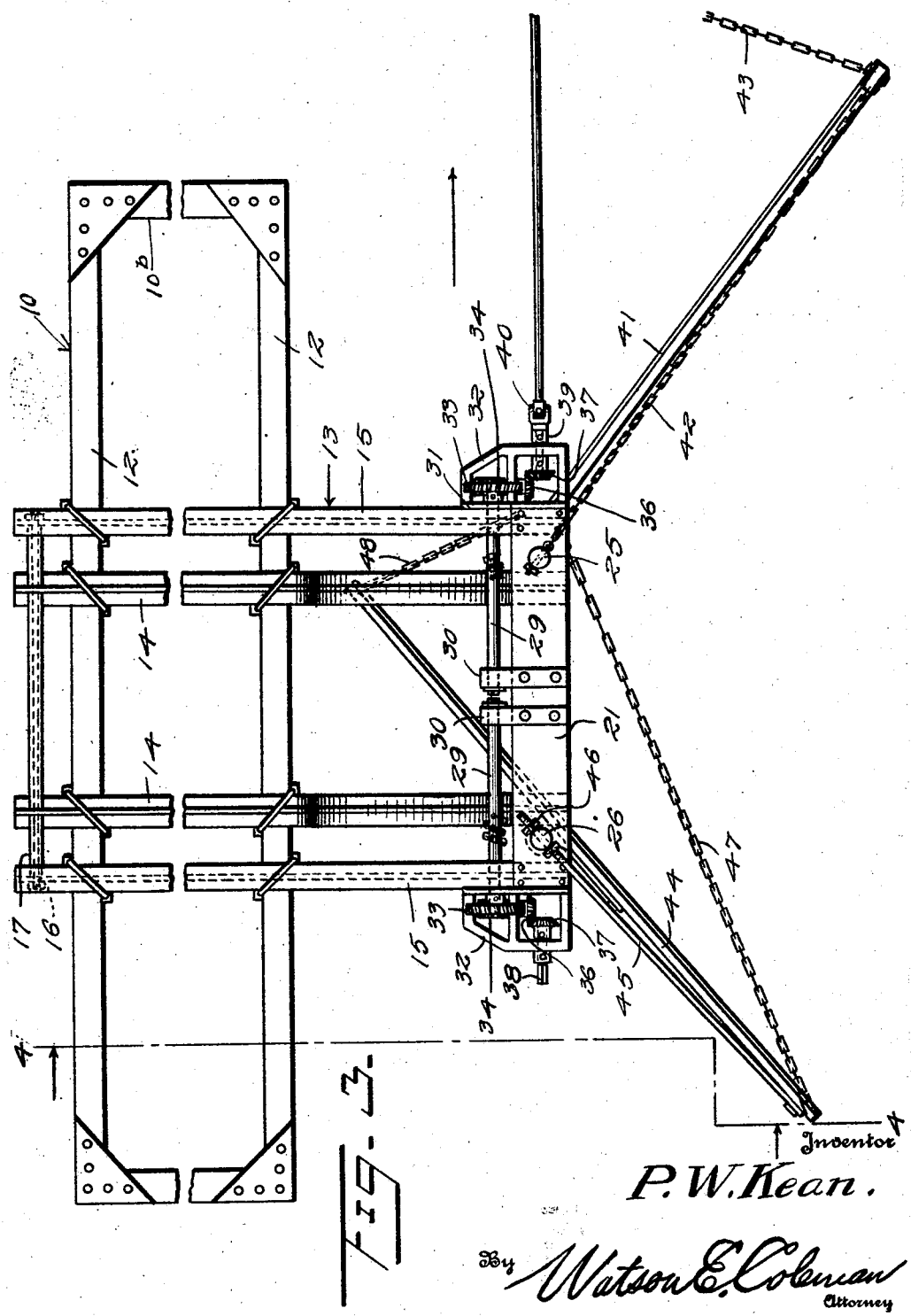

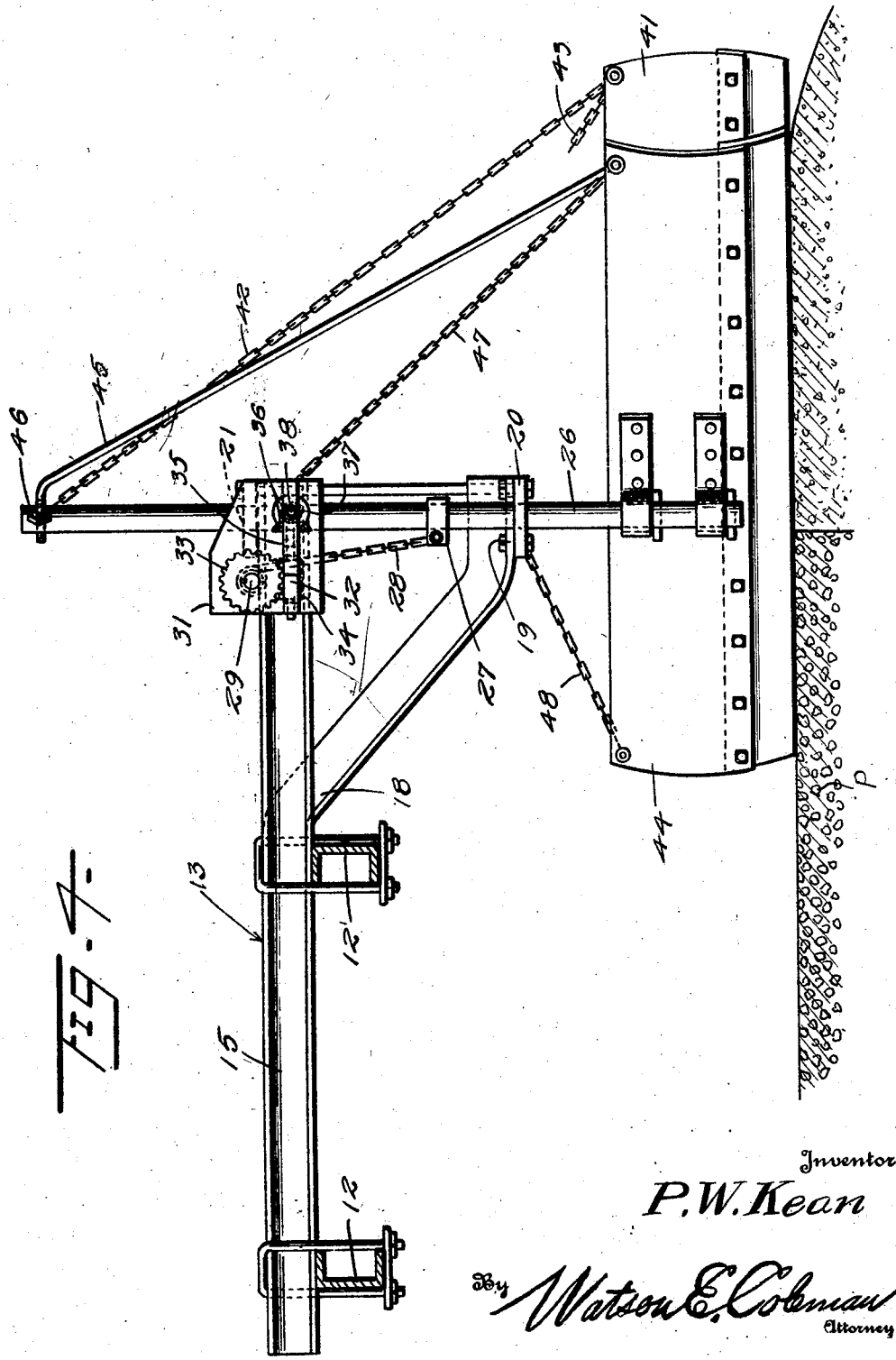

Patented Feb. 8, 1927.

1,617,256

UNITED STATES PATENT OFFICE.

PAUL W. KEAN, OF CORVALLIS, OREGON.

ROAD GRADER.

Application filed February 25, 1926. Serial No. 90,545.

This invention relates to road graders and more particularly to a device for leveling the dirt at the sides of a paved road with the surface of the paving.

A further object of the invention is to provide a device of this character which may be constructed as an attachment either for a truck or trailer drawn by a truck and which will require the services of but one man in its operation, who may be the driver of the truck.

A further object of the invention is to provide a device of this character which is readily adjustable to meet varying conditions and in which the blades are so constructed that they may be readily shifted to inoperative position during transportation of the device from place to place.

These and other objects I attain by the construction shown in the accompanying drawings, wherein for the purpose of illustration is shown a preferred embodiment of my invention and wherein:—

Figure 1 is a partially diagrammatic plan view of a road grader constructed in accordance with my invention;

Figure 2 is a side elevation showing the mountings of the scraper blades upon the frame;

Figure 3 is an enlarged plan view of the trailer section showing the supporting frame with the blade mountings thereon;

Figure 4 is a section on the line 4—4 of Figure 3.

Referring now more particularly to the drawings, the numeral 10 generally designates a wheel supported frame, at present illustrated, as formed in two sections 10<sup>a</sup> and 10<sup>b</sup> in which the prior is a tractor section and may be a motor truck and the latter is a trailer section connected to the section 10<sup>a</sup> by a draw-bar 11. The frame at the section 10<sup>b</sup> includes parallel longitudinally extending frame members 12 to which is secured a supporting framework 13 which projects to one side of the frame section 10<sup>b</sup>, as clearly shown. The framework 13 consists of inner and outer pairs of parallel bars 14 and 15 which are connected at one end thereof by a through-bolt 16 upon which intermediate the bars are applied spacers 17 for maintaining the bars in properly spaced relation. The bars at the ends thereof connected by the through-bolt 16 have their lower faces arranged in substantially the same plane and this arrangement continues for a distance slightly greater than the width of the frame. At the ends of this distance, the inner bars 14 are bent downwardly and outwardly, as more clearly shown at 18 in Figure 4 and have their lower ends horizontally extending, as indicated at 19. These lower ends are connected by a longitudinally extending shelf 20 which is slightly longer than the distance between opposite side faces of the bars 14. The bars 15 are straight and at their outer ends are connected by a shelf 21 extending vertically above the shelf 20. Crossed braces 22 connect the outer ends of each bar 15 to the bar 14 at the opposite side of the frame.

Formed in each end of the shelf 20 immediately outwardly of the adjacent bar 14 is an opening 23 and the shelf 21 is provided with openings 24 vertically aligning with the openings 23. Vertically slidable and rotatable through the forward set of openings 23, 24, is a king bolt 25 while a similar king bolt 26 is directed through the rear set of openings. Each king bolt has secured thereto a collar 27 to which is attached the lower end of a chain 28, the upper end of which is wound about a shaft 29. There is a shaft 29 for each king bolt and these shafts each have their inner ends journaled in a bearing 30 secured to the shelf 21 and their outer ends projecting through the vertical plate 31 of a bearing bracket 32. To the outer end of each shaft 29 is secured a worm gear 33 which meshes with a worm 34 of a shaft 35 mounted in bearings carried by the bearing bracket 32. The shaft 35 has secured thereto a bevel pinion 36 which meshes with a bevel pinion 37 on a shaft 38 having an operating handle 39. The operating handle of the shaft 36 associated with the forward king bolt 25 is preferably connected thereto by a universal joint 40. The operating handle is sufficiently elongated to enable its deposition adjacent the driver's seat of the tractor section 10<sup>a</sup> (not herein disclosed).

To the lower end of the king bolt 25 is secured the inner end of a blade 41, the connection being such as to permit movement of the outer end of the blade in a vertical plane. The outer end of this blade is connected with the upper end of the king bolt 25 by a chain 42 which definitely limits the downward movement of the outer end of the blade and is adjustable as to length. The outer end of the blade is further connected by a flexible element 43 with the frame 10 at a point in advance of the supporting frame 13 in such manner that this blade, during operation of the device, angles forwardly and outwardly from its king bolt. At the lower end of the king bolt 26, a blade 44 is secured intermediate its ends and at a point more clearly adjacent its inner than its outer end. The outer end of this blade is connected with the upper end of the king bolt 26 by a bar 45, the connection of which with the upper end of the king bolt is adjustable, as indicated at 46, so that the angular position of the blade 44 with relation to the king bolt 26 may be determined. At the same time, the blade 44 may be held rigidly in position with relation to the king bolt. The outer end of the blade 44 is connected in advance of the rear end of the blade 44 with the shelf 21 or some other fixed point of the frame 13 or frame 10 by a flexible element 47 which is adjustable as to length and which is at all times of such length that the blade occupies a position substantially at right angles to the blade 41 and is intersected by the plane of the blade adjacent the inner end thereof. The inner end of this blade is connected with a fixed point forwardly of such inner end by a second chain 48.

In the operation of the device, the blades are arranged and adjusted to conform to the width of the particular shoulder which is to be maintained after which but little attention need be given to the blades. The forward blade inclining outwardly and downwardly and engaging with the material outwardly of the edge of the pavement P moves material inwardly and delivers it against the rear blade 44 adjacent the inner end thereof. The paving acts as a guide for the rear or strike-off blade 44 and since the wheels of the supporting frame would maintain this frame in approximate alignment with the roadway, it follows that the blade 44 which again directs the material outwardly to the shoulder S may be at all times maintained in proper relation to the roadway. In event any obstruction is met with, such as a small raise on the surface of the roadway, the blade 44, together with its king bolt, may move vertically until it has passed over this obstruction. In operation, the heel or inner end of the lower edge of the blade 41 should be kept in approximate alignment with the outer edge of the paving.

It has been found that a structure of this character may be operated at a speed of five miles an hour and give excellent results. When it is desired to transport the device from place to place, the shafts 29 may be operated through the handles 39 to elevate the blades 41 and 44 clear of the ground or paving. The rear blade is then swung back by loosening the guard chains 47 and 48 and the guard chain 43 of the front blade is disconnected and this blade swung alongside of the blade 44 so that the blades do not project to any appreciable extent beyond the inner face of the supporting structure or framework 13. With the blades in this position, they could be moved at any speed of which the tractor element is capable.

It will be obvious that the construction hereinbefore set forth is capable of a certain range of change and modification without materially departing from the spirit of the invention and I accordingly do not limit myself to such specific structure except as hereinafter claimed.

I claim:—

1. In combination with a wheel supported frame, a supporting framework attached thereto and projecting to one side thereof and affording pairs of vertically aligned bearings spaced longitudinally of the wheel supported frame, a king bolt rotatable and vertically adjustable in each pair of bearings, a blade secured at its rear end to the forward king bolt and extending outwardly and forwardly therefrom, a second blade secured intermediate its ends to the lower end of the rear king bolt and disposed at substantially right angles to the first named blade, the inner end of the last named blade being disposed inwardly of the inner end of the first named blade and means for limiting rearward movement of the outer ends of the blade.

2. In combination with a wheel supported frame, a supporting framework attached thereto and projecting to one side thereof and affording pairs of vertically aligned bearings spaced longitudinally of the wheel supported frame, a king bolt rotatable and vertically adjustable in each pair of bearings, a blade secured at its rear end to the forward king bolt and extending outwardly and forwardly therefrom, a second blade secured intermediate its ends to the lower end of the rear king bolt and disposed at substantially right angles to the first named blade, the inner end of the last named blade being disposed inwardly of the inner end of the first named blade, means for limiting rearward movement of the outer ends of the blade and means for adjustably limiting downward movement of the king bolts.

3. In combination with a wheel supported frame, a supporting framework attached thereto and projecting to one side thereof and affording pairs of vertically aligned bearings spaced longitudinally of the wheel supported frame, a king bolt rotatable and vertically adjustable in each pair of bearings, a blade secured at its rear end to the forward king bolt and extending outwardly and forwardly therefrom, a second blade secured intermediate its ends to the lower end of the rear king bolt and disposed at substantially right angles to the first named blade, the inner end of the last named blade being disposed inwardly of the inner end of the first named blade, means for limiting rearward movement of the outer ends of the blade, means for adjustably limiting downward movement of the king bolts including a shaft associated with each king bolt, a collar secured to each king bolt, a chain connecting the collar of each king bolt with the shaft associated with the king bolt and means for rotating the shaft to elevate the king bolt.

4. In combination with a wheel supported frame, a supporting framework attached thereto and projecting to one side thereof and affording pairs of vertically aligned bearings spaced longitudinally of the wheel supported frame, a king bolt rotatable and vertically adjustable in each pair of bearings, a blade secured at its rear end to the forward king bolt and extending outwardly and forwardly therefrom, a second blade secured intermediate its ends to the lower end of the rear king bolt and disposed at substantially right angles to the first named blade, the inner end of the last named blade being disposed inwardly of the inner end of the first named blade and means for limiting rearward movement of the outer ends of the blade releasable to permit movement of the blades to a position where they substantially parallel the line of travel of the wheel supported frame.

5. In a grading attachment of the character described, a supporting framework including parallel bars arranged in pairs, means connecting the bars at one end thereof for maintaining the same in spaced assembled relation, one pair of the bars being downwardly offset adjacent the opposite end thereof, the offset portions being connected by a shelf, the other pair of bars being straight and likewise being connected by a shelf, the last named shelf overlying the first named shelf, said shelves having aligned longitudinally spaced pairs of openings, a king bolt rotatably and vertically adjustable through each pair of openings, a blade secured to the lower end of each of the king bolts and means for vertically adjusting the king bolts.

6. In combination with a wheel supported frame, a supporting framework attached thereto and projecting to one side thereof and affording pairs of vertically aligned bearings spaced longitudinally of the wheel supported frame, a king bolt rotatable and vertically adjustable in each pair of bearings a blade secured at its rear end to the forward king bolt and extending outwardly and forwardly therefrom, a second blade secured intermediate its ends to the lower end of the rear king bolt and disposed at substantially right angles to the first named blade, the inner end of the last named blade being disposed inwardly of the inner end of the first named blade, means for limiting rearward movement of the outer ends of the blades and means for vertically adjusting the blades including a shaft associated with each king bolt, a collar secured to the king bolt between the bearings, a chain connecting the collar of each king bolt with its respective shaft and means for rotating said shafts.

In testimony whereof I hereunto affix my signature.

PAUL W. KEAN.